United States Patent
Oonishi et al.

(10) Patent No.: US 7,783,420 B2
(45) Date of Patent: Aug. 24, 2010

(54) ROUTE GUIDANCE SYSTEMS, METHODS, AND PROGRAMS

(75) Inventors: Shino Oonishi, Okazaki (JP); Takaaki Nakayama, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 636 days.

(21) Appl. No.: 11/645,662

(22) Filed: Dec. 27, 2006

(65) Prior Publication Data

US 2007/0225907 A1 Sep. 27, 2007

(30) Foreign Application Priority Data

Dec. 28, 2005 (JP) .............................. 2005-379920

(51) Int. Cl.
*G01C 21/30* (2006.01)
(52) U.S. Cl. ..................... 701/209; 701/211
(58) Field of Classification Search ................. 701/209, 701/211, 300
See application file for complete search history.

(56) References Cited

U.S. PATENT DOCUMENTS

| 6,385,536 | B2 * | 5/2002 | Kimura | ..................... 701/209 |
| 2005/0143911 | A1 * | 6/2005 | Ishibashi et al. | ............. 701/209 |
| 2005/0171688 | A1 * | 8/2005 | Fujita et al. | ................. 701/201 |
| 2005/0200467 | A1 * | 9/2005 | Au et al. | ...................... 340/465 |
| 2006/0031008 | A1 * | 2/2006 | Kimura et al. | .............. 701/208 |

FOREIGN PATENT DOCUMENTS

| CN | 1576792 A | 2/2005 |
| JP | A 07-105487 | 4/1995 |
| JP | A 2001-101581 | 4/2001 |
| JP | A 2005-004442 | 1/2005 |
| JP | A 2005-189008 | 7/2005 |
| JP | A 2005-189009 | 7/2005 |
| JP | A 2005-214883 | 8/2005 |
| TW | 239384 B | 9/2005 |

OTHER PUBLICATIONS

Nov. 27, 2009 Office Action for Chinese Patent Application No. 2006101682821 (with English translation).
Japanese Office Action with English-language translation mailed Feb. 2, 2010 for Japanese Patent Application No. 2005-379920.

* cited by examiner

*Primary Examiner*—Mark Hellner
*Assistant Examiner*—Helal A Algahaim
(74) *Attorney, Agent, or Firm*—Oliff & Berridge, PLC

(57) ABSTRACT

A route guidance systems, methods, and programs detect a current position of a vehicle and search for a route to a destination based on the vehicle position. The systems, methods, and programs set a recommended travel lane based on the searched route and determine whether the vehicle is in a particular lane, the determination based on image data of lane demarcation lines, the image data obtained by a camera attached to the vehicle. When the particular lane cannot be determined, the systems, methods, and programs predict the lane in which the vehicle is driving based on the image data and execute lane guidance based on the predicted driving lane.

14 Claims, 7 Drawing Sheets

ROUTE GUIDANCE SYSTEMS, METHODS, AND PROGRAMS

INCORPORATION BY REFERENCE

The disclosure of Japanese Patent Application No. 2005-379920, filed on Dec. 28, 2005, including the specification, drawings and abstract is incorporated herein by reference in its entirety.

BACKGROUND

1. Related Technical Fields

Related technical fields include route guidance systems, methods, and programs.

2. Description of the Related Art

A navigation apparatus mounted on a vehicle detects a current position of the vehicle by GPS (global positioning system), reads out map data from a data storing section, displays a map screen on a display section, and displays the vehicle position indicating the current position of the vehicle on a map of the area surrounding the vehicle. Therefore, a driver of the vehicle may drive the vehicle using the vehicle position displayed on the map as an aid.

When the driver inputs a destination and sets a route search condition, a route from the current position as a starting point to the destination is searched on the basis of the search condition. The searched route is displayed together with the vehicle position on the map, and the driver is provided guidance along the searched route. Therefore, the driver may drive the vehicle following the searched route.

In the above navigation system, if a plurality of lanes are formed in a road, the lane in which the vehicle is driving can be specified based on a driving history of lanes driven, local features on the road, and the like. If the driving lane is specified, the specified route is sought by lane, and lane guidance is executed. For example, a lane that is recommended as the one in which the vehicle should travel is set as a recommended lane, and the vehicle is guided to the recommended lane.

SUMMARY

However, in the above conventional navigation system, it is sometimes not possible to specify the driving lane based on the driving history, the local features on the road, and the like. In those cases, it becomes impossible to execute appropriate route guidance.

Various exemplary implementations of the broad principles described herein provide systems, methods, and programs that execute appropriate route guidance even in a case where the driving lane cannot be specified.

Exemplary implementations provide systems, methods, and programs that may detect a current position of a vehicle and may search for a route to a destination based on the vehicle position. The systems, methods, and programs may set a recommended travel lane based on the searched route and may determine whether the vehicle is in a particular lane, the determination based on image data of lane demarcation lines, the image data obtained by a camera attached to the vehicle. When the particular lane cannot be determined, the systems, methods, and programs may predict the lane in which the vehicle is driving based on the image data and may execute lane guidance based on the predicted driving lane.

DETAILED DESCRIPTION OF EXEMPLARY IMPLEMENTATIONS

Figure 1:
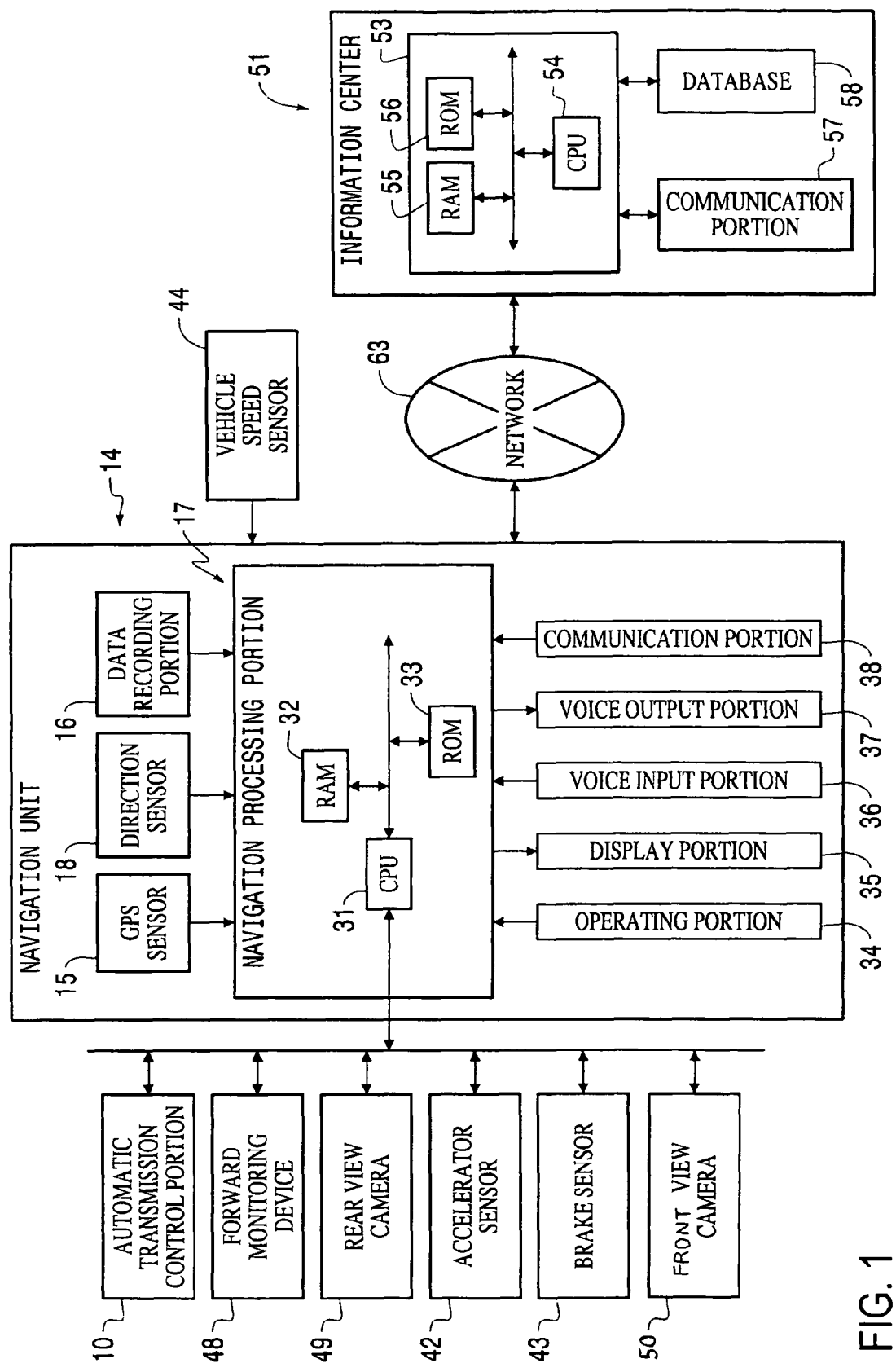
FIG. 1 is a diagram showing an exemplary navigation system.

FIG. 1 shows an exemplary navigation system. As shown in FIG. 1, the navigation system may include, for example, an automatic transmission control portion 10. The automatic transmission control portion 10 may control a power train for changing gear at a predetermined transmission gear ratio such as, for example, a continuously variable transmission (CVT), an automatic transmission, and/or an electric drive system.

The navigation system may include, for example, an information terminal, such as, for example, an on-board navigation unit 14 mounted on a vehicle. The navigation system may include, for example, a network 63 and an information center 51 as an information provider.

The navigation unit 14 may include, for example, a GPS sensor 15 for detecting a current position of the vehicle, a memory (e.g., data storing portion 16) for storing map data and various types of information, and a controller (e.g., navigation processing portion 17) for performing various calculations such as navigation processing on the basis of input information. The navigation unit 14 may include, for example, a direction sensor 18 for detecting a vehicle direction, an operating portion 34 for receiving input from a user, a display portion 35 for displaying various images on a screen (not shown) to guide the driver, and an audio input portion (e.g., voice input portion 36) for performing audio input. The navigation unit 14 may include, for example, an audio output portion (e.g., voice output portion 37) for outputting various audio messages to aid the driver and a communication portion 38. The GPS sensor 15, the data recording portion 16, the direction sensor 18, the operating portion 34, the display portion 35, the voice input portion 36, the voice output portion 37, and the communication portion 38 may be connected to the navigation processing portion 17.

The automatic transmission control portion 10, a forward monitoring device 48 that is mounted at a predetermined position in the front part of the vehicle for monitoring the area in front of the vehicle, a rear view camera 49 that is mounted at a predetermined position in the rear part of the vehicle, a front view camera 50, an accelerator sensor 42 for detecting the degree of opening of an accelerator pedal (not shown), a brake sensor 43 for detecting the level of braking applied to the vehicle through a brake pedal (not shown), and a vehicle speed sensor 44 for detecting the vehicle speed may also be connected to the navigation processing portion 17. Note that, for example, the accelerator sensor 42 and the brake sensor 43 may detect information related to vehicle operation by the driver.

The GPS sensor 15 may detect a current position on the earth by receiving a radio wave from a satellite and may also detect a time. However, a distance sensor, a steering sensor, and/or an altimeter (not shown) may be used independently or together instead of the GPS sensor 15. A gyro sensor or a geomagnetic sensor may be used as the direction sensor 18. Note that, these sensors are not needed when the GPS sensor has a function of detecting, for example, a vehicle direction and a vehicle speed.

The data storing portion 16 may include a map database including a map data file to store map data therein. The map data may include intersection data regarding intersections, node data regarding nodes, road data regarding road links, search data processed for searching, facility data regarding facilities, and feature data regarding features on a road. As used herein, the term "road link" refers to, for example, a road or portion of a road. For example, according to one type of road data, each road may consist of a plurality of componential units called links. Each link may be separated and defined by "nodes," for example, an intersection, an intersection having more than three roads, a curve, and/or a point at which the road type changes.

Road features may include an object set or formed on a road that provides travel information to the driver or that provides travel guidance to the driver such as, for example, a line, a road sign, a crosswalk, a manhole, and/or a traffic light. The line may be a stop line indicating where a vehicle should stop, a line separating vehicular lanes, or a line indicating a parking space. The road sign may be an information sign indicating a direction of a lane by means of an arrow, a warning sign such as "STOP" to notify the driver of a stop line or a direction sign such as "the direction of XX" to provide directions to a location. The feature data may include position information indicating the positions of features by means of coordinates and/or image information indicating features by means of images. Note that, the stop line may include an entrance from a non-priority road to a priority road, a railroad crossing, and/or an intersection with a blinking red light.

The road data regarding the lanes may include lane data such as a lane number for each lane on roads and/or lane position information. The data storing portion 16 may store data for outputting predetermined information by the voice output portion 37.

Further, the data storing portion 16 may include a statistical database including a statistical data file and/or a travel history database including a travel history data file, and statistical data is stored in the statistical data file as past record data as is travel history data in the travel history data file.

The statistical data may include a past record of traffic information, that is, history information indicating travel history. The statistical data may include various types of information, that is, for example, past traffic information provided by a road traffic information center (not shown) such as a VICS (Vehicle Information and Communication System), road traffic census information indicating traffic volume obtained by a road traffic census provided by the National Land and Transportation Ministry, and road timetable information provided by the National Land and Transportation Ministry, and such information may be used individually/collectively, modified, or undergo statistical processing, if needed. Note that, congestion prediction information for predicting traffic congestion may be added to the statistical data. In that case, detailed conditions such as date and time, day of the week, weather, various events, season, facility information (presence or absence of large facilities such as a department store and/or a supermarket) may be added to the history information to create the statistical data.

As data items for the statistical data, a link number for each of a plurality of road links, a direction flag indicating a travel direction, a type of information, a congestion degree at each of a plurality of predetermined times, a link required travel times indicating the lengths of time required to travel the road links at predetermined times, and/or average data of the link required time for each day of the week may be included.

The travel history data may be collected from a plurality of vehicles, that is, from the vehicle mounted with the navigation apparatus and/or other vehicles, by the information center 51. The travel history data may include past record information indicating the travel record of roads along which each vehicle has traveled and is calculated and stored as probe data on the basis of travel data.

As data items for the travel history data, a link required travel time and a congestion degree for each road link at a predetermined time may be included. Note that, the travel history data may be added to the statistical data. Further, the congestion degree may be displayed as a congestion indicator, for example, "congested," "crowded," and "not congested," indicating the degree of traffic congestion.

The data storing portion 16 may include a disk (not shown) such as a hard disk, a CD, a DVD, or an optical disk to store the various data described above and also include a head (not shown) such as a readout/writing head to read out/write various data. For example, a memory card may be used as the data storing portion 16. Note that, an external storage device or a memory card may be one of the disks described above.

The map database, the statistical database, and the travel history database may be included in the data storing portion 16. However, one or more of the map database, the statistical database, and the travel history database may be included in the information center 51 instead.

The navigation processing portion 17 may include, for example, a CPU 31 as a control device as well as a calculating device for controlling the whole navigation apparatus 14, a RAM 32 as a working memory for helping the CPU 31 to perform various calculations, a ROM 33 for storing a control program and various programs for searching for a route to a destination or for route guidance, and a flash memory (not shown) for storing various data and programs. Note that, an internal storage device may be the RAM 32, the ROM 33, or the flash memory.

Various programs may be stored in the ROM 33 and various data may be stored in the data storing portion 16. However, such programs and data may be stored on, for example, a disk. In this case, the programs and/or data may be read out from the disk and may be written to a flash memory. Therefore, the programs and/or data may be updated by changing the disk. Further, control program and/or data of the automatic transmission control portion 10 may be stored on the disk as well. Then the programs and data may be received through the communication portion 38 and stored in the flash memory of the navigation processing portion 17.

By the driver's operation, the operating portion 34 may be used for correcting a current position when the vehicle starts moving, inputting a starting point and a destination, inputting a point to be passed, and activating the communication portion 38. A keyboard or a mouse that is different from the display portion 35 may be used as the operating portion 34. Also, a touch panel with image operating portions such as various keys, switches, and buttons may be used as the operating portion 34. Such keys, switches, and buttons may be displayed on a screen of the display portion 35 and touched or clicked for a predetermined input operation.

A display may be used as the display portion 35. In various screens displayed on the display portion 35, for example, a current position of the vehicle as a vehicle position, a vehicle direction, a map, a searched route, guide information along the searched route, traffic information, a distance to a next intersection on the searched route, and/or a travel direction at the next intersection may be displayed. Further, operating instructions and guidance of operating menu/keys of the image operating portion, the operating portion 34, and the audio input portion 36 as well as an FM multiplex telecasting program name may be displayed in the various screens of the display portion 35.

The voice input portion 36 may include a microphone (not shown) to input necessary information by audio. The voice output portion 37 includes a speech synthesis device and a speaker (not shown) to output an audio message synthesized by the speech synthesis device for, for example, the searched route, guidance information, and/or traffic information.

The communication portion 38 may include a beacon receiver and/or an FM receiver. The beacon receiver (for example, electric wave beacon and/or optical beacon) may receive various types of information such as current traffic information and general information sent from, for example, the road traffic information center via, for example, an electric wave beacon device and/or optical beacon device provided along a road. The FM receiver may also receive such information as multiple broadcasts via an FM broadcast station. The traffic information may include, for example, congestion information, road sign information, parking lot information, traffic accident information, and/or information on the busy status of service areas. The general information may include, for example, news and weather reports. The beacon receiver and the FM receiver may be one unit provided as a VICS receiver, or each may be provided separately.

The traffic information may include a type of information, a mesh number to specify a mesh, a link number for specifying a road link which connects two points, for example, two intersections and for indicating the difference between inbound and outbound traffic on the road link, and link information indicating information corresponding to the link number. For example, when traffic information is congestion information, the link information may include data about the head of a traffic jam indicating a distance from the start point of the road link to the head of the traffic jam, the congestion degree, the length of the traffic jam indicating the distance from the head of the traffic jam to the end of the traffic jam, and a link required travel time indicating the length of time required to travel the road link.

The communication portion 38 may receive the map data, the statistical data, the travel history data, and various information such as traffic information and general information from the information center 51 through the network 63.

The information center 51 may include, for example, a controller (e.g., server 53), a communication portion 57 connected to the server 53, and memory (e.g., database (DB) 58). The server 53 may include a CPU 54, an RAM 55, and an ROM 56 as a control device and a calculating device. Data the same as the various data stored in the data storing portion 16 such as the map data, the statistical data, and the travel history data may be stored in the database 58. The information center 51 may provide current traffic information and various information such as general information sent from the road traffic information center and travel history data collected from a plurality of vehicles (the vehicle mounted with the navigation apparatus and/or other vehicles) in real time.

The forward monitoring device 48 may include a laser radar, a radar such as a millimeter wave radar, and/or a supersonic sensor, and such radars and sensors may be used individually or collectively to monitor a vehicle in front of the vehicle mounted with the navigation apparatus, a stop line, and/or an obstacle. The forward monitoring device 48 may detect a relative vehicle speed to the vehicle in front of the vehicle mounted with the navigation apparatus, an approach speed to a stop sign/obstacle as area information and calculates the distance between both vehicles and the time required to reach the next vehicle.

The rear view camera 49 including a CCD sensor is attached to the rear part of the vehicle and the optic axis of the rear view camera 49 is directed downward to monitor the area behind the vehicle. The rear view camera 49 may image a vehicle traveling behind the vehicle mounted with the navigation apparatus, a building on the side of the road, and/or a structural object as well as a feature, create image data of such an object, and send the image data to the CPU 31. The CPU 31 may read the image data, execute image processing, and determine each of the objects in the image as a specific object. A C-MOS sensor may be used instead of a CCD sensor.

The front view camera 50 may be installed at a prescribed location on the front end of the vehicle and may serve as a photography unit that captures images of the area in front of the vehicle and as a forward monitoring unit.

Note that, the navigation system, the navigation processing portion 17, the CPUs 31 and 54, and the server 53 may function as a controller individually or collectively to execute processing using various programs and data. The data storing portion 16, the RAMs 32 and 55, the ROMs 33 and 56, the database 58, and/or the flash memory may function as a memory. For example, an MPU may be used as a processing device instead of the CPUs 31 and 54.

Next, a basic operation of the navigation system with the structure determined as described above will be described.

When the navigation apparatus 14 is activated by the driver's operation of the operating portion 34, the CPU 31 may read a current vehicle position detected by the GPS sensor 15 and a vehicle position detected by the direction sensor 18, and may initialize various data. Next, the CPU 31 may determine on which road link the current position is located on the basis of a movement locus of the current position, and a shape and a position of each road link of roads around the current position, and may specify the current position. The current position may be specified, for example, on the basis of positions of each feature that is imaged by the rear camera 49.

The CPU 31 may read image data from the rear camera 49 and may recognize a feature in an image within the image data. The CPU 31 may calculate the distance between the rear camera 49 and the actual feature on the basis of the position of the feature in the image. The CPU 31 may then read the distance described above, further read feature data from the data storing portion 16, obtain the coordinates of the feature, and specify the current position on the basis of the coordinates and the distance.

The CPU 31 may detect a current traveling lane on the basis of the recognized feature in the image data and the feature data read out from the data storing portion 16.

Note that, the CPU 31 may read an output from the geomagnetic sensor, determine whether there is an object which is made of a ferromagnetic material such as a predetermined manhole on the road on the basis of the output from the sensor, and detect a traveling lane on the basis of the determination. Further, the current position may be detected with high accuracy by using the high-precision GPS sensor 15. As a result, the traveling lane may be detected on the basis of the result of the detection of the current position. If needed, while image processing is executed for image data of display lines, the traveling lane may be detected by using the output from the geomagnetic sensor and the current position collectively.

The CPU 31 may specify the driving lane based on a driving history of lanes driven or based on a local feature or the like that is recognized based on the image data or, as necessary, specifying the driving lane based on a result of checking the feature against the feature data that are read from the data storage portion 16. Also, as necessary, the driving lane can be specified by combining the sensor output from the geomagnetic sensor, the current position, and the like at the same time that image processing is executed on the image data of the marking lines.

The CPU 31 may read out and obtain the map data from the data storing portion 16 or to receive and obtain the map data from the information center 51 through the communication portion 38. Note that, when obtaining the map data from the information center 51, the CPU 31 may download the received map data on a flash memory.

The CPU 31 may display various screens on the display portion 35. For example, the CPU 31 may display a map screen on the display portion 35 and display an area map as well as the current vehicle position and the vehicle direction on the map screen. As a result, the driver may drive the vehicle on the basis of the map, the vehicle position, and the vehicle direction.

When the driver inputs a destination by operating the operating portion 34, the CPU 31 may set the destination. If needed, a starting point may be input and set. Further, if a predetermined point is stored in advance, the stored point may be set as a destination. When the driver inputs a search condition by operating the operating portion 34, the CPU 31 may set a search condition.

After setting the destination and the search condition, the CPU 31 may read out the current position, the destination, and the search condition, read search data from the data storing portion 16, search for a route from the starting point (e.g., the current position) to the destination on the basis of the search condition, the read current position, the destination, and the search data. The CPU 31 may then output route data indicating the searched route. In this case, a route that has the minimum total amount of link costs for road links on the route may be chosen as the search route.

When a road has a plurality of lanes and a current traveling lane is detected among the lanes, the CPU 31 may search for a route including the traveling lane. In this case, the lane number of the traveling lane may be included in the route data.

Note that, the information center 51 may execute route searching processing. The CPU 31 may send the current position, the destination, and the search condition to the information center 51. After the information center 51 receives the current position, the destination, and the search condition, the CPU 54 may read out search data from the database 58, searches for a route from the starting point to the destination on the search condition on the basis of the current position, the destination, an the search data, and outputs route data indicating the searched route. Then the CPU 54 may send the route data to the navigation apparatus 14.

The CPU 31 may provide guidance along the route. The CPU 31 may read the route data and may display the searched route on the map screen on the basis of the route data.

When the vehicle needs to turn right or left at a predetermined intersection while the route guidance is performed, the intersection is set as a guidance target point and as a turn intersection. The CPU 31 may determine whether there is an intersection at which the vehicle needs to turn right or left on the basis of the searched route of the route data. When there is such intersection, the intersection may be set as the turn intersection by the CPU 31. Note that, as the turn intersection, any intersection at which an entering road and a plurality of exiting roads are crossed with each other such as a junction of three roads, a right angle cross road, and a junction of five roads may be included.

When the route is searched at the lane level, the CPU 31 may recommend a lane. For example, a recommended traveling lane for passing through the turn intersection such as a suitable lane for entering to the turn intersection or a suitable lane for leaving from the turn intersection may be selected and set as a recommended lane. The CPU 31 may display the searched route on the map screen, display an enlarged view of the traveling road of the vehicle in a predetermined range of the map screen, and perform the lane guidance using the road enlarged view. In the road enlarged view, each lane and the set recommended lane may be displayed.

The CPU 31 may output audio route guidance from the voice outputting portion 37. The CPU 31 may set one or more than one route guidance points at each point which is in front of the turn intersection on the searched route and is a predetermined distance away from each other. When the vehicle arrives at each of the route guidance points, the route guidance for the turn intersection whose content is preset corresponding to each of the route guidance points may be performed. For example, route guidance for a distance from the vehicle position to the turn intersection or for a right or left turn at the turn intersection may be performed. When a recommended lane is set, The CPU 31 may perform the lane guidance whose content is preset corresponding to each of the route guidance points. For example, the lane guidance for each of recommended lanes between the vehicle position and the turn intersection or the lane guidance for a recommended lane coming after the turn intersection may be performed. When the driving lane is different from the recommended lane, the CPU 31 guides the vehicle from the driving lane to the recommended lane. Therefore, it is possible for the driver to drive the vehicle in the recommended lane.

The CPU 31 may read the intersection data and, before the vehicle arrives at the guidance intersection, displays an enlarged map of the guidance intersection, that is, an enlarged intersection map, in a specified area of the map screen. In this case, a map of the area surrounding the guidance intersection, the specified route, and landmarks such as facilities and the like at the guidance intersection may be displayed on the enlarged intersection map. Also, in a case where a plurality of lanes are formed in the road by which the vehicle enters the guidance intersection (hereinafter called the entry road) or in the road by which the vehicle exits the guidance intersection (hereinafter called the exit road) and lane guidance is executed, the CPU 31 may display the recommended lanes on the enlarged intersection map. For that purpose, the intersection data may include an intersection name, the entry road, the exit road, the presence or absence of a traffic signal, the type of traffic signal, and the like.

Incidentally, as explained earlier, the CPU 31 may specify the driving lane based on a driving history of lanes driven or based on a local feature or the like that is recognized based on the image data. Further, as necessary, the CPU 31 may specify the driving lane based on the result of checking a feature of the road against the feature data read from the data storage portion 16. However, sometimes it may not be possible to specify the driving lane based on the driving history, features, and the like.

For example, when the driving lane is specified based on the driving history, it can be difficult to specify the driving lane as the vehicle passes through an intersection, turns right or left, or goes straight ahead, because no lane demarcation lines are formed in the intersection. Also, when the number of driving lanes on a road increases, it can be difficult to specify the driving lane, because the lane demarcation lines change. It may also be difficult to specify the driving lane when the vehicle is driving for a long time without moving between lanes.

When the driving lane is specified based on a feature in the road or the like, can be difficult to specify the driving lane if there are no features particular to a lane. It can also become difficult to specify the driving lane when there is no radio wave beacon, optical beacon, or the like.

However even in such cases, it is possible to specify the driving lane based on the relationship between the road boundary lines and the lane boundary lines among the lane demarcation lines.

Examples of such methods of determining the driving lane are described below with reference to FIGS. 2-14. These exemplary methods may be implemented, for example, by one or more components of the above-described system. However, even though the exemplary structure of the above-described system may be referenced in the description, it should be appreciated that the structure is exemplary and the exemplary methods need not be limited by any of the above-described exemplary structure.

Figure 2:
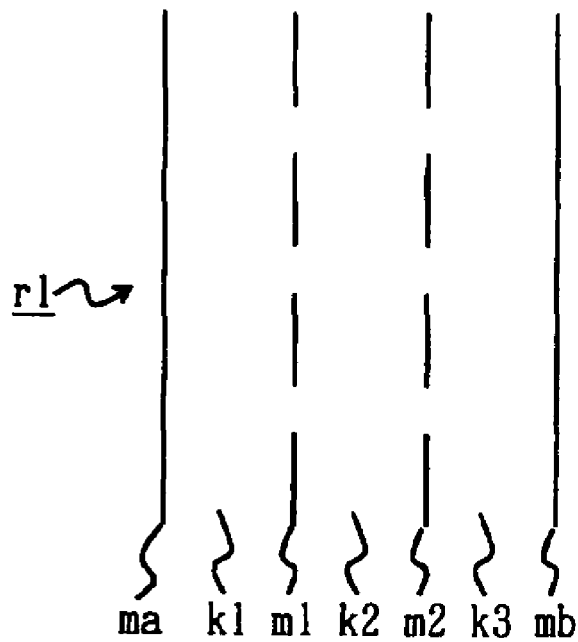
FIG. 2 is a diagram showing an exemplary driving lane specification method.
Figure 3:
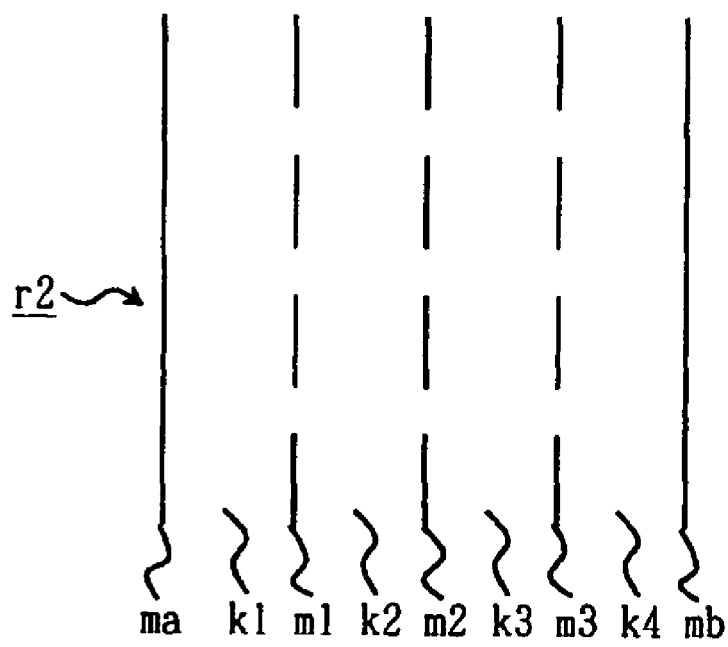
FIG. 3 is a diagram showing an exemplary driving lane specification method.

FIGS. 2 and 3 are diagrams showing driving lane specification methods. In the diagrams, the reference symbols r1, r2 denote roads, the reference symbols k1 to k4 denote lanes, the reference symbol ma denotes road boundary lines that are formed as solid lines on the shoulder sides of the roads, the reference symbol mb denotes road boundary lines that are formed as solid lines on the sides toward the oncoming traffic lanes (the side that mb is on will vary depending on the country), the reference symbols m1 to m3 denote lane boundary lines that are formed as broken lines between lanes k1, k2, between lanes k2, k3, and between lanes k3, k4. Lane demarcation lines are made up of the road boundary lines ma, mb and lane boundary lines m1 to m3.

For example, on the three-lane road r1, the road boundary lines ma, mb are formed as solid lines on the shoulder side of the road and the side toward the oncoming traffic lane. The two-lane boundary lines m1, m2 are formed as broken lines between the road boundary lines ma, mb. Therefore, if the road boundary line ma and the lane boundary line m1 are recognized based on the image data of the lane demarcation lines, the lane k1 can be specified as the driving lane. If the lane boundary lines m1, m2 are recognized, the lane k2 can be specified as the driving lane. If the lane boundary line m2 and the road boundary line mb are recognized, the lane k3 can be specified as the driving lane.

Also, on the four-lane road r2, the road boundary lines ma, mb are formed as solid lines on the shoulder side of the road and the side toward the oncoming traffic lane. The three-lane boundary lines m1 to m3 are formed as broken lines between the road boundary lines ma, mb. Therefore, if the road boundary line ma and the lane boundary line m1 are recognized based on the image data of the lane demarcation lines, the lane k1 can be specified as the driving lane, because the road boundary line ma is a solid line and the lane boundary line m1 is a broken line. If the lane boundary line m3 and the road boundary line mb are recognized, the lane k4 can be specified as the driving lane, because the lane boundary line m3 is a broken line and the road boundary line mb is a solid line. In contrast, if the lane boundary lines m1, m2 are recognized, or if the lane boundary lines m2, m3 are recognized, it is not clear whether the lane k2 or the lane k3 is the driving lane, because the lane boundary lines m1, m2 and m3 are all broken lines.

Thus, based on the relationship between the road boundary lines ma, mb and the lane boundary lines m1 to m3, the CPU 31 is able to specify the lanes k1 to k3 as the driving lane on the three-lane road r1 and to specify the lanes k1, k4 as the driving lane on the four-lane road r2.

On the three-lane road r1, it is not possible to specify the driving lane if the vehicle is straddling the lanes k1, k2 or is straddling the lanes k2, k3. On the four-lane road r2, it is not possible to specify the driving lane if the vehicle is in the lanes k2, k3, is straddling the lanes k1, k2, is straddling the lanes k2, k3, or is straddling the lanes k3, k4.

Therefore, for example, if the CPU 31 cannot specify the driving lane, the CPU 31 predicts the driving lane and executes lane guidance based on the assumed driving lane.

The driving lane may be predicted for example as follows. An example of the prediction in which the host vehicle is traveling on the three-lane road r1 will be explained first with reference to FIGS. 4-10.

The reference symbol r1 denotes a road, the reference symbols k1 to k3 denote lanes, the reference symbols pr1, pr2 denote host vehicle positions, the reference symbols ma, mb denote road boundary lines, and the reference symbols m1, m2 denote lane boundary lines. Note that in FIG. 5, the lane k1 is the recommended lane, and in FIG. 9, the lane k2 is the recommended lane.

Figure 4:
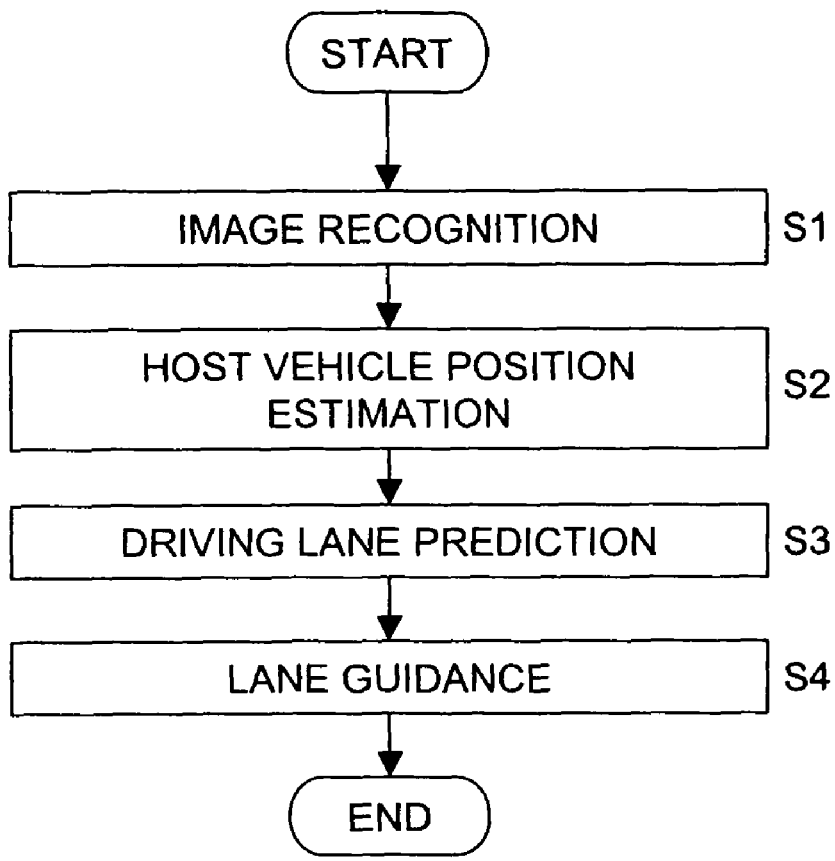
FIG. 4 is a flowchart showing an exemplary guidance method.

As shown in FIG. 4, according to this exemplary method, the CPU 31 executes image recognition processing (S1). This may be done, for example, by reading in image data from the rear view camera 49 and recognizing the lane demarcation lines in the image data (e.g., image field f1). In FIGS. 6A-8C, the lane demarcation lines in the image field f1 are the road boundary line ma and the lane boundary lines m1, m2. For the purpose of recognizing demarcation lines purpose, the angle of view of the rear view camera 49 may be set to a value in the horizontal direction that allows two or more lane demarcation lines to be recognized.

Next, the position of the host vehicle is estimated, for example, by host vehicle position estimation processing (S2) to determine whether the host vehicle is in the recommended lane. For example, the CPU 31 may determine whether the host vehicle is straddling two specific lanes. As shown in FIGS. 6A-8C, when the lane boundary line m1 is present in the image field f1, the CPU 31 may determine from the position of the lane boundary line m1 whether the host vehicle is straddling the lanes k1, k2. Specifically, in the image field f1, CPU 31 may compute a number of pixels NL from a left edge e1 to the lane demarcation line m1 and a number of pixels NR from a right edge e2 to the lane demarcation line m1. The CPU 31 may then compute, as a percentage, a position determination index g, that expresses the ratio of the number of pixels NL to the total number of pixels NL, NR according to the following formula (1):

$$g = \frac{NL}{NL + NR} \cdot 100\% \tag{1}$$

In a case where the position determination index g is not less than about 10% and not greater than about 90%, the CPU 31 may determine that the host vehicle is straddling the lanes k1, k2. In a case where the position determination index g is less than about 10% or greater than about 90%, the CPU 31 may determine that the host vehicle is not straddling the lanes k1, k2.

If it is determined that the host vehicle is straddling the lanes k1, k2, the CPU 31 may start a timer and may read the current position. The CPU 31 may then determine whether the conditions for determining a state of straddling the lanes k1, k2 have been fulfilled by determining whether the host vehicle has traveled straddling the lanes k1, k2 for a pre-set specified time and a pre-set specified distance.

Next, if the conditions are fulfilled (the host vehicle has traveled for the specified time and the specified distance while straddling the lanes k1, k2), the CPU 31 determines in what state the host vehicle is straddling the lanes k1, k2 at the point in time when determination conditions are fulfilled.

Figure 6A:
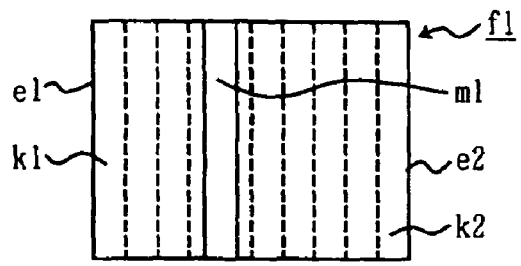
FIGS. 6A-6C are diagrams showing a lane-straddling state of a vehicle.
Figure 6B:
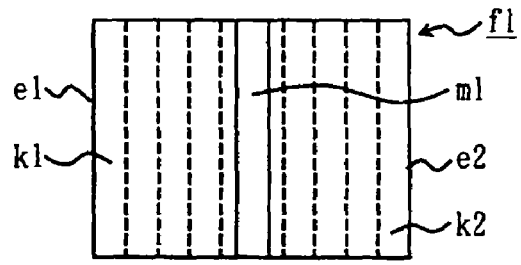
Figure 6C:
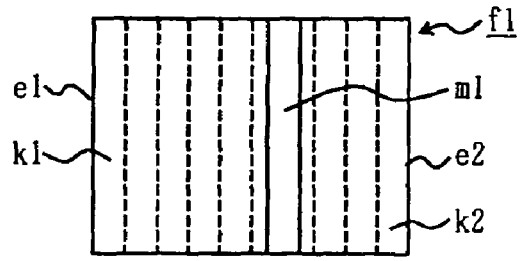
Figure 7A:
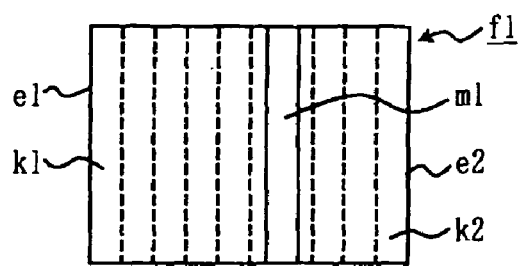
FIGS. 7A-7C are diagrams showing a lane-straddling state of a vehicle.
Figure 7B:
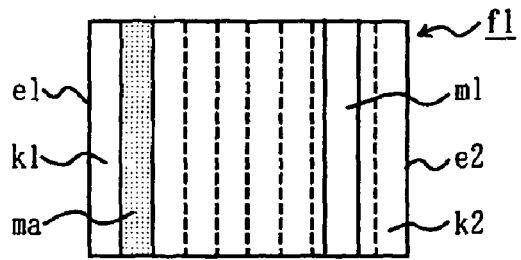
Figure 7C:
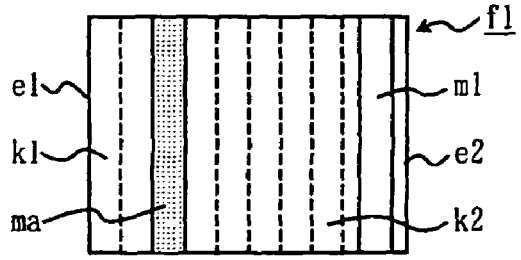
Figure 8A:
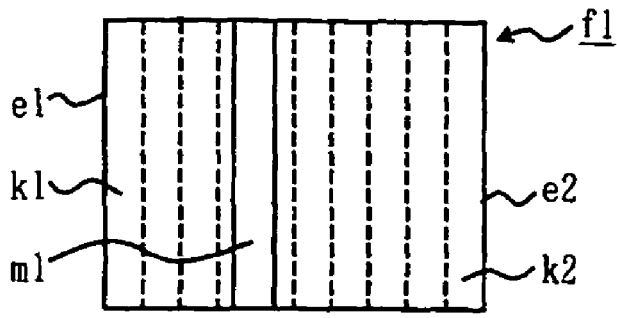
FIGS. 8A-8C are diagrams showing a lane-straddling state of a vehicle.
Figure 8B:
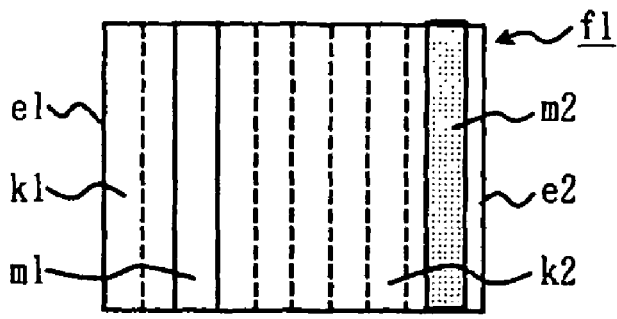
Figure 8C:
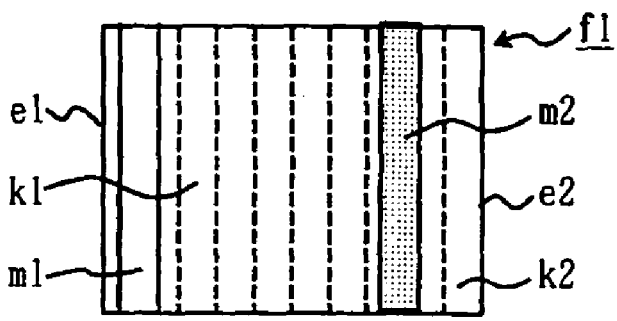

Specifically, if, as shown in shown in FIGS. 6A-6C, the position determination index g is not less than about 40% and not greater than about 60%, the CPU may determine that the host vehicle is straddling the lanes k1, k2 equally. If, as shown in shown in FIGS. 7A-7C, the position determination index g is greater than about 60% and not greater than about 90%, the CPU may determine that the host vehicle is straddling the lanes k1, k2 more to the left. If, as shown in shown in FIGS. 8A-8C, the position determination index g is not less than about 10% and less than about 40%, the CPU 31 may determine that the host vehicle is straddling the lanes k1, k2 more to the right.

Note that in the examples shown in FIGS. 6A to 8C, the determination of whether the host vehicle is straddling the lanes k1, k2 and the determination of what manner the host vehicle is straddling is determined according to the position of the lane boundary line m1. However, the matter of whether the host vehicle is straddling the lanes k2, k3 and in what manner the host vehicle is straddling can be determined in the same manner according to the position of the lane boundary line m2.

Next, the lane or lanes in which the vehicle might be driving are is predicted, for example, based on the results of straddling determination, and on the results of straddling state determination. That is, if it is not clear whether the host vehicle is in the recommended lane (it might be or it might not be), or if the host vehicle is not in the recommended lane, the CPU 31 computes the lanes that are candidates for the host vehicle location.

For example, on the three-lane road r1, if the vehicle is in one of the lanes k1 to k3, it is possible to specify the driving lane, so the CPU 31 does not compute the candidate lanes. In contrast, if the vehicle is straddling the lanes k1, k2, or is straddling the lanes k2, k3, it is not possible to specify the driving lane. Therefore, the CPU 31 computes the lanes k1 to k3 as the candidate lanes.

Also, for example, on the four-lane road r2, if the vehicle is in the lane k1 or the lane k4, it is possible to specify the driving lane, so the CPU 31 does not compute the candidate lanes. In contrast, if the vehicle is in the lane k2 or the lane k3, is straddling the lanes k1, k2, is straddling the lanes k2, k3, or is straddling the lanes k3, k4, it is not possible to specify the driving lane. Therefore, if the vehicle is in the lane k2 or the lane k3, the CPU 31 computes the lanes k2, k3 as the candidate lanes. If the vehicle is straddling the lanes k1, k2, is straddling the lanes k2, k3, or is straddling the lanes k3, k4, the CPU 31 computes the lanes k1 to k4 as the candidate lanes.

Figure 5:
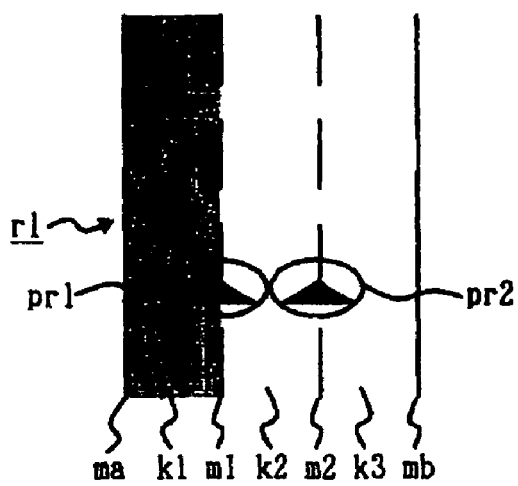
FIG. 5 is a diagram showing a driving state of a vehicle.

Next, a driving lane is predicted (S3), for example, as a farthest candidate lane from the recommended lane. For example, if the vehicle is straddling the lanes k1, k2 equally, as shown in FIG. 5 by the host vehicle position pr1, or is straddling the lanes k2, k3 equally, as shown in FIG. 5 by the host vehicle position pr2, the CPU 31 determines that the host vehicle is not in the recommended lane and computes the lanes k1 to k3 as the candidate lanes. The CPU 31 then assumes that the lane k3 is the driving lane, because the lane k3 is the lane farthest from the lane k1, the recommended lane.

Then, the CPU 31 starts lane guidance (S4), for example, in the form of voice phrases, timing the start of the lane guidance based on the distance required for the vehicle to move from the lane k3 to the recommended lane, that is, the required movement distance Lx.

For example, in a case where the system will guide the host vehicle into the recommended lane, it is possible to set a point h1 at which the lane guidance will start, to set a point h2 where interim lane guidance will be executed 300 m before the guidance intersection, and to compute a distance Lh1 from the point h1 to the guidance intersection as described below.

Specifically, when a unit movement distance required to move one lane is set to 250 m, if the vehicle speed is 60 km/h, the per-second speed can be expressed as almost 17 m/sec. The required movement distance Lx is the distance required to move two lanes, from the lane k3 to the lane k1, so it is expressed as follows:

$$Lx = 2 \cdot 250 \text{ m} = 500 \text{ m}$$

If the time required to output voice phrases to guide the host vehicle into the recommended lane (guidance time t1) is 3 seconds and, when the vehicle has entered the recommended lane, the time required to output voice phrases to the effect that the vehicle has entered the recommended lane (a reporting time t2) is 2 seconds, then the distance Lh1 is expressed as follows:

$$Lh1 = (3 \text{ sec} \cdot 17 \text{ m/sec}) + 500 \text{ m} + (2 \text{ sec} \cdot 17 \text{ m/sec}) + 300 \text{ m} = 885 \text{ m}$$

That is, the lane guidance must start at the point h1, 885 m before the guidance intersection.

In this case, it has been determined that the host vehicle is not in the recommended lane, so the guiding of the host vehicle into the recommended lane by means of lane guidance is executed in terms of an absolute position. Specifically, for example, a message such as "Turn left about 900 meters ahead. The farthest lane to the left is the recommended lane," or the like may be output by voice. Also, thereafter, a message such as "The farthest lane to the left is the recommended lane," or the like may be output by voice to guide the host vehicle to the recommended lane by voice once again. Moreover, it becomes possible to specify the driving lane as the host vehicle changes lanes, so when the host vehicle has entered the recommended lane, a message such as "You have entered the recommended lane," or the like may be output by voice.

Figure 9:
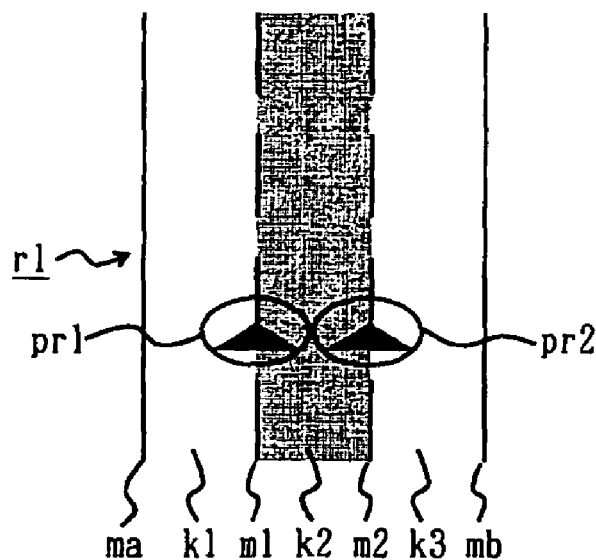
FIG. 9 is a diagram showing a driving state of a vehicle.
Figure 10:
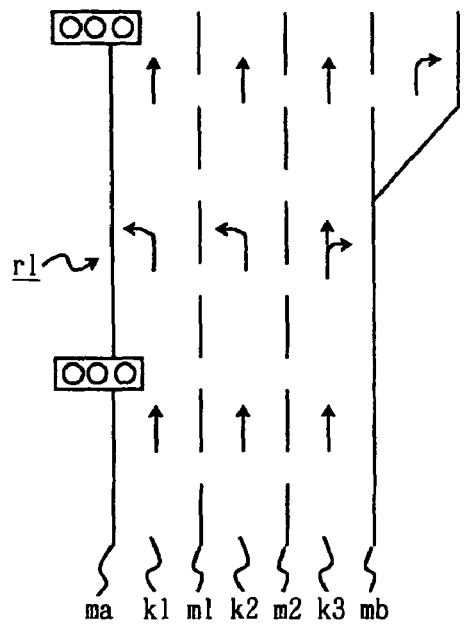
FIG. 10 is a diagram showing an exemplary display.

Also, in a case where the host vehicle is straddling the lanes k1, k2 equally, as shown in FIG. 9 by the host vehicle position pr1, or is straddling the lanes k2, k3 equally, as shown in FIG. 9 by the host vehicle position pr2, the CPU 31 may determine that the host vehicle is not in the recommended lane and may computes the lanes k1 to k3 as the candidate lanes. The CPU 31 may then assumes that the lanes k1, k3 are the driving lanes, because the lanes k1, k3 are the lanes farthest from the lane k2, the recommended lane.

Therefore, the required movement distance Lx is the distance required to move one lane, from either of the lanes k1, k3 to the lane k2. Thus, Lx may be expressed as follows:

$$Lx = 1 \cdot 250 \text{ m} = 250 \text{ m}$$

The distance Lh1 may then be expressed as follows:

$$Lh1=(3\ sec\cdot 17\ m/sec)+250\ m+(2\ sec\cdot 17\ m/sec)+300\ m=635\ m$$

That is, the lane guidance must start at the point h1 635 meters before the guidance intersection.

Note that, as described above, the driving lane cannot be specified, so the CPU 31 does not display the host vehicle position. Rather the CPU may show the exemplary screen of FIG. 10.

Next, an example of the method will be described for a case in which the driving lane on the four-lane road r2 is predicted with respect to FIGS. 11-14.

In the diagrams, the reference symbol r2 denotes a road, the reference symbols k1 to k4 denote lanes, the reference symbols pr1, pr2 denote host vehicle positions, the reference symbols ma, mb denote road boundary lines, and the reference symbols m1 to m3 denote lane boundary lines. Note that in FIG. 11, the lane k1 is the recommended lane; in FIG. 12, the lane k4 is the recommended lane; in FIG. 13, the lane k2 is the recommended lane; and in FIG. 14, the lane k3 is the recommended lane.

Figure 11:
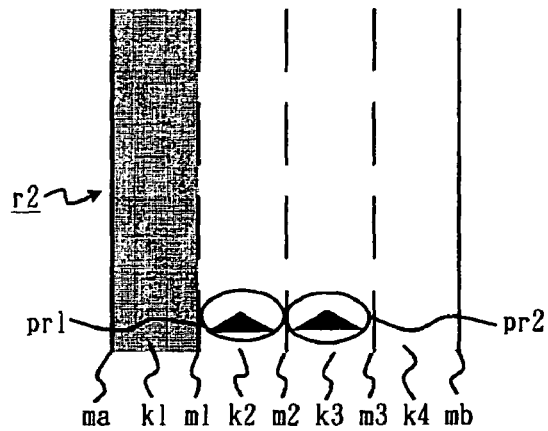
FIG. 11 is a diagram showing a driving state of a vehicle.

For example, when the host vehicle is in the lane k2, as shown in FIG. 11 by the host vehicle position pr1, or where the host vehicle is in the lane k3, the CPU 31 determines that the host vehicle is not in the recommended lane and computes the lanes k2, k3 as the candidate lanes. The CPU 31 then predicts that the lane k3 is the driving lane, because, of the lanes k2, k3, the lane k3 is the lane farthest from the lane k1, the recommended lane.

Next, the CPU 31 starts lane guidance in the form of voice phrases, timing the start of the lane guidance based on the required movement distance Lx (the distance required for the vehicle to move from the lane k3 to the recommended lane). For example, for the system to guide the host vehicle into the recommended lane, the required movement distance Lx is the distance required to move two lanes, from the lane k3 to the lane k1, so it is expressed as follows:

$$Lx=2\cdot 250\ m=500\ m$$

Also, the distance Lh1 is expressed as follows:

$$Lh1=(3\ sec\cdot 17\ m/sec)+500\ m+(2\ sec\cdot 17\ m/sec)+300\ m=885\ m$$

That is, the lane guidance must start at the point h1 885 m before the guidance intersection.

In this case, it has been determined that the host vehicle is not in the recommended lane, so the guiding of the host vehicle into the recommended lane by means of lane guidance is executed in terms of an absolute position. Specifically, for example, a message such as "Turn left about 900 meters ahead. The farthest lane to the left is the recommended lane," or the like may be output by voice. Also, thereafter, a message such as "The farthest lane to the left is the recommended lane," or the like may be output by voice to guide the host vehicle to the recommended lane by voice once again. Moreover, it becomes possible to specify the driving lane as the host vehicle changes lanes, so when the host vehicle has entered the recommended lane, a message such as "You have entered the recommended lane," or the like may be output by voice.

Figure 12:
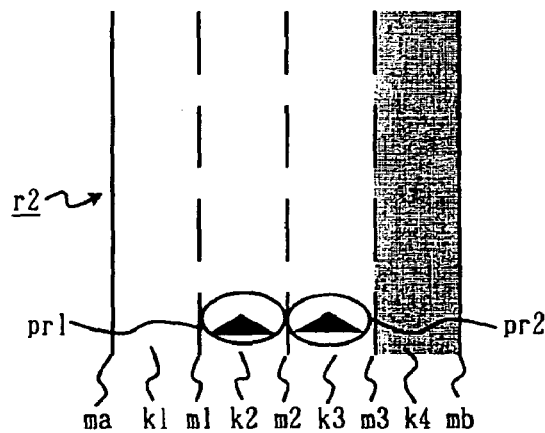
FIG. 12 is a diagram showing a driving state of a vehicle.

Also, in a case where the host vehicle is in the lane k2, as shown in FIG. 12 by the host vehicle position pr1, or where the host vehicle is in the lane k3, the CPU 31 determines that the host vehicle is not in the recommended lane and computes the lanes k2, k3 as the candidate lanes. The CPU then predicts that the lane k2 is the driving lane, because, of the lanes k2, k3, the lane k2 is the lane farthest from the lane k4, the recommended lane.

Next, the CPU 31 starts lane guidance in the form of voice phrases, timing the start of the lane guidance based on the required movement distance Lx, the distance required for the vehicle to move from the lane k2 to the recommended lane. For example, in a case where the system will guide the host vehicle into the recommended lane, the required movement distance Lx is the distance required to move two lanes, from the lane k2 to the lane k4, so it is expressed as follows:

$$Lx=2\cdot 250\ m=500\ m$$

Also, the distance Lh1 is expressed as follows:

$$Lh1=(3\ sec\cdot 17\ m/sec)+500\ m+(2\ sec\cdot 17\ m/sec)+300\ m=885\ m$$

That is, the lane guidance must start at the point h1 885 m before the guidance intersection.

In this case, it has been determined that the host vehicle is not in the recommended lane, so the guiding of the host vehicle into the recommended lane by means of lane guidance is executed in terms of an absolute position. Specifically, for example, a message such as "Turn right about 900 meters ahead. The farthest lane to the right is the recommended lane," or the like may be output by voice. Also, thereafter, a message such as "The farthest lane to the right is the recommended lane," or the like may be output by voice to guide the host vehicle to the recommended lane by voice once again. Moreover, it becomes possible to specify the driving lane as the host vehicle changes lanes, so when the host vehicle has entered the recommended lane, a message such as "You have entered the recommended lane," or the like may be output by voice.

Figure 13:
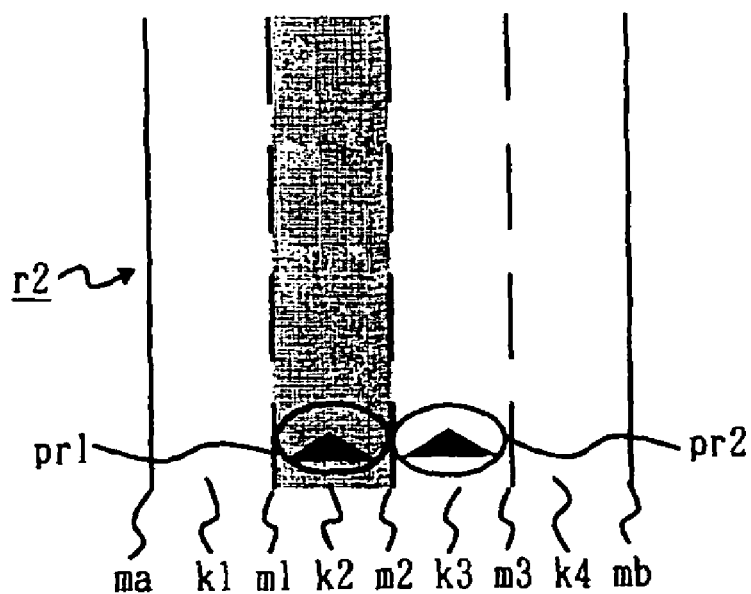
FIG. 13 is a diagram showing a driving state of a vehicle.

Also, in a case where the host vehicle is in the lane k2, as shown in FIG. 13 by the host vehicle position pr1, or where the host vehicle is in the lane k3, the CPU 31 determines that it is unclear whether the host vehicle is in the recommended lane and computes the lanes k2, k3 as the candidate lanes. The CPU 31 then predicts that the lane k3 is the driving lane, because, of the lanes k2, k3, the lane k3 is the lane farthest from the lane k2, the recommended lane.

Next, the CPU 31 starts lane guidance in the form of voice phrases, timing the start of the lane guidance based on the required movement distance Lx, the distance required for the vehicle to move from the lane k3 to the recommended lane. For example, in a case where the system will guide the host vehicle into the recommended lane, the required movement distance Lx is the distance required to move one lane, from the lane k3 to the lane k2, so it is expressed as follows:

$$Lx=1\cdot 250\ m=250\ m$$

The distance Lh1 may then be expressed as follows:

$$Lh1=(3\ sec\cdot 17\ m/sec)+250\ m+(2\ sec\cdot 17\ m/sec)+300\ m=635\ m$$

That is, the lane guidance must start at the point h1 635 meters before the guidance intersection.

In this case, it has been determined that the host vehicle is not in the recommended lane, so the guiding of the host vehicle into the recommended lane by means of lane guidance is executed in terms of an absolute position. Specifically, for example, a message such as "Turn left in 700 meters. The second lane from the left is the recommended lane," or the like may be output by voice. Also, thereafter, a message such as "The second lane from the left is the recommended lane," or the like may be output by voice to guide the host vehicle to the recommended lane by voice once again. Moreover, it becomes possible to specify the driving lane as the host vehicle changes lanes, so when the host vehicle has entered the recommended lane, a message such as "You have entered the recommended lane," or the like may be output by voice.

Figure 14:
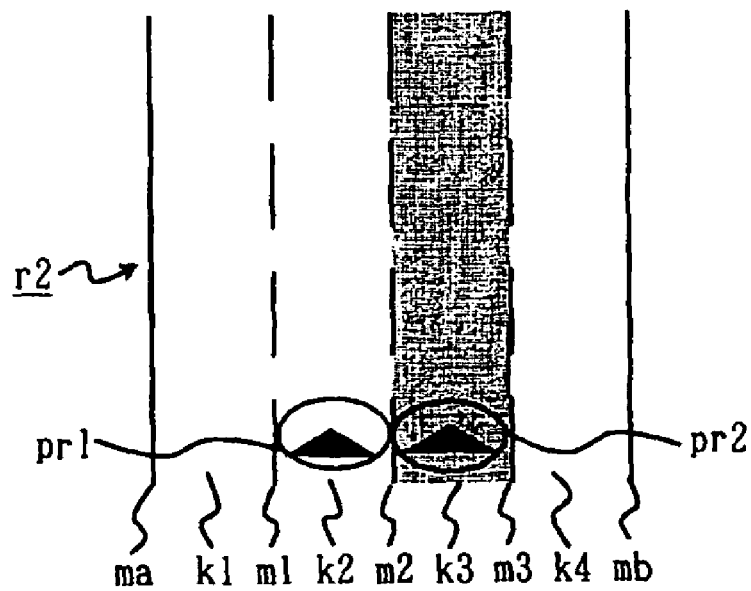
FIG. 14 is a diagram showing a driving state of a vehicle.

Also, in a case where the host vehicle is in the lane k2, as shown in FIG. 14 by the host vehicle position pr1, or where the host vehicle is in the lane k3, the CPU 31 determines that it is unclear whether the host vehicle is in the recommended lane and computes the lanes k2, k3 as the candidate lanes. The CPU 31 then predicts that the lane k2 is the driving lane, because, of the lanes k2, k3, the lane k2 is the lane farthest from the lane k3, the recommended lane.

Next, the CPU 31 starts lane guidance in the form of voice phrases, timing the start of the lane guidance based on the required movement distance Lx, the distance required for the vehicle to move from the lane k2 to the recommended lane. For example, in a case where the system will guide the host vehicle into the recommended lane, the required movement distance Lx is the distance required to move one lane, from the lane k2 to the lane k3, so it is expressed as follows:

$$Lx = 1 \cdot 250 \text{ m} = 250 \text{ m}$$

The distance Lh1 may then be expressed as follows:

$$Lh1 = (3 \text{ sec} \cdot 17 \text{ m/sec}) + 250 \text{ m} + (2 \text{ sec} \cdot 17 \text{ m/sec}) + 300 \text{ m} = 635 \text{ m}$$

That is, the lane guidance must start at the point h1 635 meters before the guidance intersection.

In this case, it has been determined that the host vehicle is not in the recommended lane, so the guiding of the host vehicle into the recommended lane by means of lane guidance is executed in terms of an absolute position. Specifically, for example, a message such as "Turn right in 700 meters ahead. The third lane from the left is the recommended lane," or the like may be output by voice. Also, thereafter, a message such as "The third lane from the left is the recommended lane," or the like may be output by voice to guide the host vehicle to the recommended lane by voice once again. Moreover, it becomes possible to specify the driving lane as the host vehicle changes lanes, so when the host vehicle has entered the recommended lane, a message such as "You have entered the recommended lane," or the like may be output by voice.

Note that in this case, the driving lane cannot be specified, so the CPU 31 does not display the host vehicle position.

Incidentally, on roads where the number of lanes is five or more, it is sometimes not possible to specify the driving lane as the host vehicle changes lanes, so in those cases, recommended lane entering guidance is not executed when the host vehicle has entered the recommended lane. It is also possible to cancel guidance to the recommended lane or to restrict the number of times that guidance is executed, so as not to repeat guidance to the recommended lane even though the host vehicle has entered the recommended lane. In a case where the number of times that guidance is executed is restricted, the time or the distance for determining whether or not the determination conditions have been fulfilled may be lengthened.

According to the above examples, the system can infer whether the host vehicle is in the recommended lane and, based on the inference results, predict the driving lane. Therefore, appropriate lane guidance can be executed, even in a case where the driving lane cannot be specified based on the driving history, a local feature, or the like.

According to the above examples, in a case where the driving lane cannot be specified, the host vehicle position may not be displayed. However, it is possible to display a host vehicle position in each of the candidate lanes or to display a host vehicle position with enlarged dimensions, so that it extends over a plurality of candidate lanes.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A route guidance system for a vehicle, comprising:
a current position detector that detects a current position of the vehicle; and
a controller that:
searches for a route to a destination based on the vehicle position;
sets a recommended travel lane based on the searched route;
determines whether the vehicle is in a particular lane, the determination based on image data of lane demarcation lines, the image data obtained by a camera attached to the vehicle;
determines whether the vehicle is straddling lanes based on the image data;
calculates a plurality of candidate lanes based on the straddling state of the vehicle;
when the particular lane cannot be determined, predicts that the vehicle is driving in a lane that is farthest away from the recommended travel lane among the plurality of candidate lanes; and
executes lane guidance based on the predicted driving lane.

2. The route guidance system according to claim 1, wherein:
the controller determines that the vehicle position is straddling lanes when the image data indicates that about 40%-60% of the pixels of the image data are between an edge of the image data and a lane demarcation line within the image data.

3. The route guidance system according to claim 1, wherein the controller:
determines whether the vehicle is in a particular lane or predicts the lane in which the vehicle is traveling based on a relationship between lane demarcation lines, the lane demarcation lines including shoulder lines formed on a shoulder side of a road and on a side toward an oncoming traffic lane, and boundary lines, which are formed between individual lanes in an area bounded by the road boundary lines.

4. The route guidance according to claim 1, wherein the controller:
calculates a distance necessary for the vehicle to travel from the predicted driving lane to the recommended driving lane;
sets route guidance points based on the calculated distance; and
provides route guidance at the route guidance points.

5. The route guidance according to claim 1, further comprising the camera.

6. A route guidance method for a vehicle, comprising:
detecting a current position of the vehicle; and
searching for a route to a destination based on the vehicle position;
setting a recommended travel lane based on the searched route;

determining whether the vehicle is in a particular lane, the determination based on image data of lane demarcation lines, the image data obtained by a camera attached to the vehicle;

determining whether the vehicle is straddling lanes based on the image data;

calculating a plurality of candidate lanes based on the straddling state of the vehicle;

predicting, when the particular lane cannot be determined, that the vehicle is driving in a lane that is farthest away from the recommended travel lane among the plurality of candidate lanes; and executing lane guidance based on the predicted driving lane.

7. The route guidance method according to claim 6, further comprising:

determining that the vehicle position is straddling lanes when the image data indicates that about 40%-60% of the pixels of the image data are between an edge of the image data and a lane demarcation line within the image data.

8. The route guidance method according to claim 6, further comprising:

determining whether the vehicle is in a particular lane or predicts the lane in which the vehicle is traveling based on a relationship between lane demarcation lines, the lane demarcation lines including shoulder lines formed on a shoulder side of a road and on a side toward an oncoming traffic lane, and boundary lines, which are formed between individual lanes in an area bounded by the road boundary lines.

9. The route guidance method according to claim 6, further comprising:

calculating a distance necessary for the vehicle to travel from the predicted driving lane to the recommended driving lane;

setting route guidance points based on the calculated distance; and providing route guidance at the route guidance points.

10. A storage medium storing a set of program instructions executable by a data processing device, the instructions usable to implement the method of claim 6.

11. A route guidance system for a vehicle, comprising:

a current position detector that detects a current position of the vehicle; and a controller that:

searches for a route to a destination based on the vehicle position;

sets a recommended travel lane based on the searched route;

determines whether the vehicle is in a particular lane and whether the particular lane is specified, the determination based on image data of lane demarcation lines, the image data obtained by a camera attached to the vehicle;

calculates a plurality of candidate lanes based on the determination that the vehicle position is in a lane and the lane is not specified;

when the particular lane cannot be determined, predicts that the vehicle is driving in a lane that is farthest away from the recommended travel lane among the plurality of candidate lanes; and executes lane guidance based on the predicted driving lane.

12. A route guidance method for a vehicle, comprising:

detecting a current position of the vehicle; and searching for a route to a destination based on the vehicle position;

setting a recommended travel lane based on the searched route;

determining whether the vehicle is in a particular lane, the determination based on image data of lane demarcation lines, the image data obtained by a camera attached to the vehicle;

calculating a plurality of candidate lanes based on the determination that the vehicle position is in a lane;

predicting, when the particular lane cannot be determined, that the vehicle is driving in a lane that is farthest away from the recommended travel lane among the plurality of candidate lanes; and executing lane guidance based on the predicted driving lane.

13. The route guidance system according to claim 11, wherein the controller:

determines that the vehicle position is in a lane when the image data indicates that less than about 10% or more than about 90% of the pixels of the image data are between an edge of the image data and a lane demarcation line within the image data.

14. The route guidance method according to claim 12, further comprising:

determining that the vehicle position is in a lane when the image data indicates that less than about 10% or more than about 90% of the pixels of the image data are between an edge of the image data and a lane demarcation line within the image data.

* * * * *